US006193074B1

(12) United States Patent
Baum et al.

(10) Patent No.: US 6,193,074 B1
(45) Date of Patent: Feb. 27, 2001

(54) CONVEYOR FOR THE SORTING OF MIXED CARGO

(75) Inventors: Ingolf Baum, Dietzenbach; Heinrich Droste, Sinsheim; Holger Humburg, Hanau, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/186,179

(22) Filed: Nov. 4, 1998

(30) Foreign Application Priority Data

Dec. 12, 1997 (DE) ................................. 197 55 474

(51) Int. Cl.$^7$ ........................................................ B07C 5/36
(52) U.S. Cl. ...................... 209/606; 198/370.04; 209/912
(58) Field of Search ....................... 198/370.04; 209/606, 209/912

(56) References Cited

U.S. PATENT DOCUMENTS

| 3,167,192 | 1/1965 | Harrison et al. ......................... 214/62 |
| 3,231,066 | 1/1966 | Harrison et al. ....................... 198/155 |

(List continued on next page.)

FOREIGN PATENT DOCUMENTS

| 4341715C1 | 11/1994 | (DE) ............................... B65G/47/38 |
| 4342852C1 | 11/1994 | (DE) ............................... B65G/47/38 |
| 4342851A1 | 6/1995 | (DE) . |

(List continued on next page.)

OTHER PUBLICATIONS

Search Report from corresponding European Application No. EP 98 25 0391.

Primary Examiner—Christopher P. Ellis
Assistant Examiner—Joe Dillon, Sr.

(74) Attorney, Agent, or Firm—Van Dyke, Gardner, Linn and Burkhart, LLP

(57) ABSTRACT

A conveyor for the sorting of mixed cargo, especially of packages, small packets, containers and pieces of luggage, includes Carts (5) coupled to each other and each movable along Running Rails (9) and having an Undercarriage (6). Support Elements (12) are arranged on the Undercarriage (6) and spaced apart from each other in the Direction of Motion (F). A Tilting Axle (4) is mounted on the Support Elements (12) and runs in the Direction of Motion (F) for supporting through a Lever (13) a Carrying Tray (3) that can be swiveled out of a transport position that is generally horizontal into a tilted position for the lateral delivery of Mixed Cargo (2) into a predetermined target station. A Sliding Element (16) is connected in a movable fashion with the end of the Lever (13) turned away from the Carrying Tray (3) and guided between and at the Support Elements (12) crosswise to the Direction of Motion (F), for carrying out the tilting movement. At least one Switching Device (19) is mounted on the Sliding Element (16) so as to be able to swivel on a Switch Shaft (18) and lock the Carrying Tray (3) at least in the horizontal transport position. A Carrier (20) is included that, by means of a Switchpoint Element (27), can be moved during the motion into a Curved Rail (28) running along the Running Rails (9) in sections in the area of the target station, from a neutral position locking the Carrying Tray (3) into an operating position guided in the Curved Rail (28). The movement of the Sliding Element (16) and consequently the tilting movement of the Carrying Tray (3) can be controlled through the course of the Curved Rail (28). The Switch Shaft (18) of the Switching Device (19) is oriented so as to be parallel to the Tilting Axle (4) of the Carrying Tray (3) and the Guide Element (21) is arranged on the Switch Device (19). The guide element is guided in a Guide Slot (22), defined in the Support Element (12), in such a way that the Sliding Element (16) is locked in the transport position of the Carrying Tray (3) with a Switching Device (19) that is simultaneously in the neutral position, and the Carrier (20) of the Switching Device (19) is held in the Curved Rail (28) during the tilting movement of the Carrying Tray (3).

35 Claims, 7 Drawing Sheets

U.S. PATENT DOCUMENTS

| | | | |
|---|---|---|---|
| 3,269,520 | 8/1966 | Bishop et al. | 198/155 |
| 3,360,106 | 12/1967 | Harrison et al. | 198/155 |
| 3,463,298 | 8/1969 | Harrison | 198/155 |
| 3,510,014 | 5/1970 | Speaker et al. | 214/62 |
| 3,589,501 | 6/1971 | Harrison | 198/155 |
| 3,662,874 | 5/1972 | Muller | 198/155 |
| 3,669,245 | 6/1972 | Wooten et al. | 198/155 |
| 3,817,368 | 6/1974 | Wentz et al. | 198/21 |
| 4,004,681 | 1/1977 | Clewett et al. | 198/38 |
| 4,031,998 | 6/1977 | Suzuki et al. | 198/365 |
| 4,089,404 | 5/1978 | Venzke | 198/365 |
| 4,139,088 | 2/1979 | Olesen | 198/365 |
| 4,143,751 | 3/1979 | Foster et al. | 198/365 |
| 4,174,773 | 11/1979 | Venzke | 198/365 |
| 4,378,062 | 3/1983 | Macrum | 198/365 |
| 4,399,904 | 8/1983 | Canziani | 198/365 |
| 4,413,721 | 11/1983 | Bollier | 198/365 |
| 4,509,635 | 4/1985 | Emsley et al. | 198/365 |
| 4,586,613 | 5/1986 | Horii | 209/556 |
| 4,635,785 | 1/1987 | Prydtz | 198/365 |
| 4,722,430 | 2/1988 | Canziani | 198/365 |
| 4,724,948 | 2/1988 | Adams et al. | 198/474.1 |
| 4,726,464 | 2/1988 | Canziani | 198/365 |
| 4,729,466 | 3/1988 | Bollier et al. | 198/365 |
| 4,744,454 | 5/1988 | Pölling | 198/365 |
| 4,787,498 | 11/1988 | Males et al. | 198/365 |
| 4,846,335 | 7/1989 | Hartlepp | 198/365 |
| 4,856,642 | 8/1989 | Nicholson et al. | 198/365 |
| 4,961,489 | 10/1990 | Warkentin | 198/365 |
| 4,982,828 | 1/1991 | Nicolson et al. | 198/365 |
| 4,984,674 | 1/1991 | Fortenberry | 198/365 |
| 4,989,719 | 2/1991 | Ballestrazzi et al. | 198/365 |
| 5,009,563 | 4/1991 | Case et al. | 414/470 |
| 5,018,928 | 5/1991 | Hartlepp | 414/339 |
| 5,054,601 | 10/1991 | Sjogren et al. | 198/365 |
| 5,086,905 | 2/1992 | Pölling | 198/365 |
| 5,244,074 | 9/1993 | Riemrich | 198/365 |
| 5,255,774 | 10/1993 | Yokoya | 198/365 |
| 5,285,884 | 2/1994 | Polling et al. | 198/365 |
| 5,335,767 | 8/1994 | Killer et al. | 198/365 |
| 5,348,132 | 9/1994 | Maier | 198/365 |
| 5,353,912 | 10/1994 | Killer et al. | 198/365 |
| 5,372,234 | 12/1994 | Fortenbery et al. | 198/365 |
| 5,381,882 | 1/1995 | Ostholt | 198/365 |
| 5,445,080 | 8/1995 | Austin | 104/119 |
| 5,477,955 | 12/1995 | Madden et al. | 198/370.04 |
| 5,489,017 | 2/1996 | Bonnet | 198/370.04 |
| 5,611,419 | 3/1997 | LaVars | 198/370.04 |
| 5,662,206 | 9/1997 | Baum et al. | 198/370.04 |
| 5,664,660 | 9/1997 | Prydtz et al. | 198/370.04 |

FOREIGN PATENT DOCUMENTS

| | | | |
|---|---|---|---|
| 4447396C1 | 6/1996 | (DE) . | |
| 0425021B1 | 6/1993 | (EP) | B65G/23/23 |
| 0664262A1 | 7/1995 | (EP) . | |
| 2144698 | 3/1985 | (GB) | B65G/47/24 |

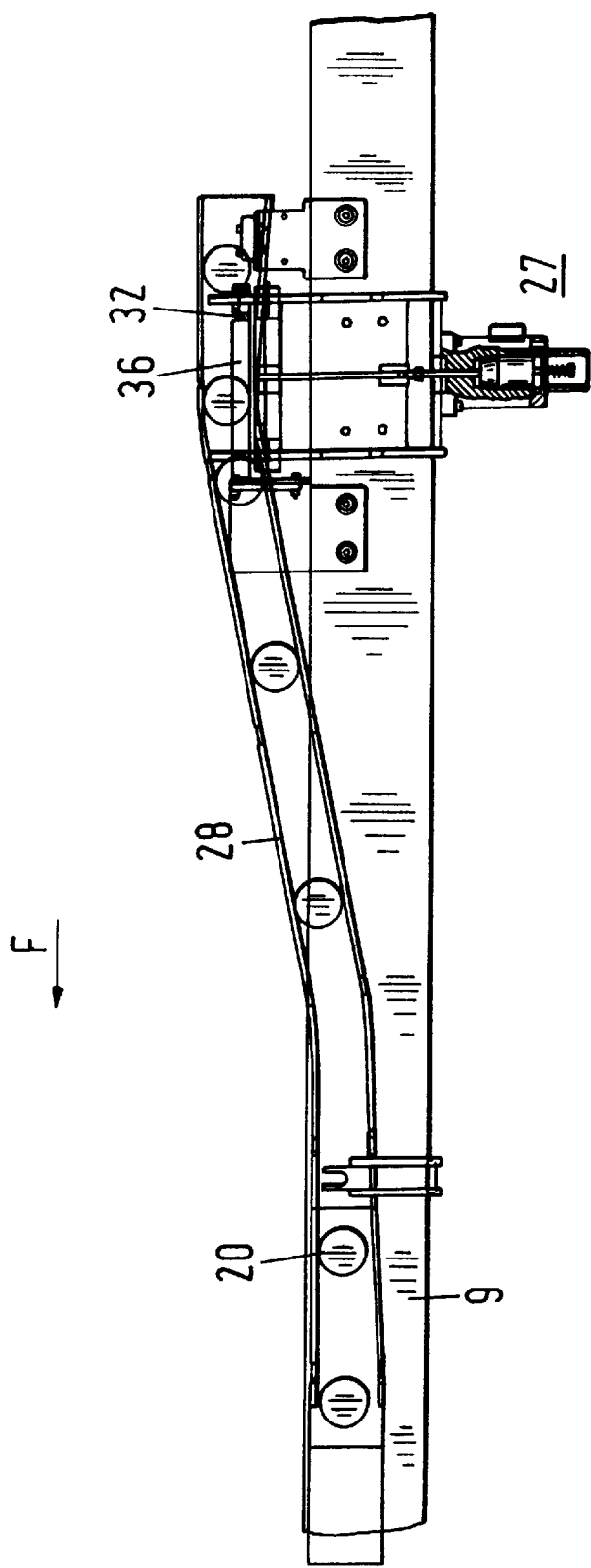

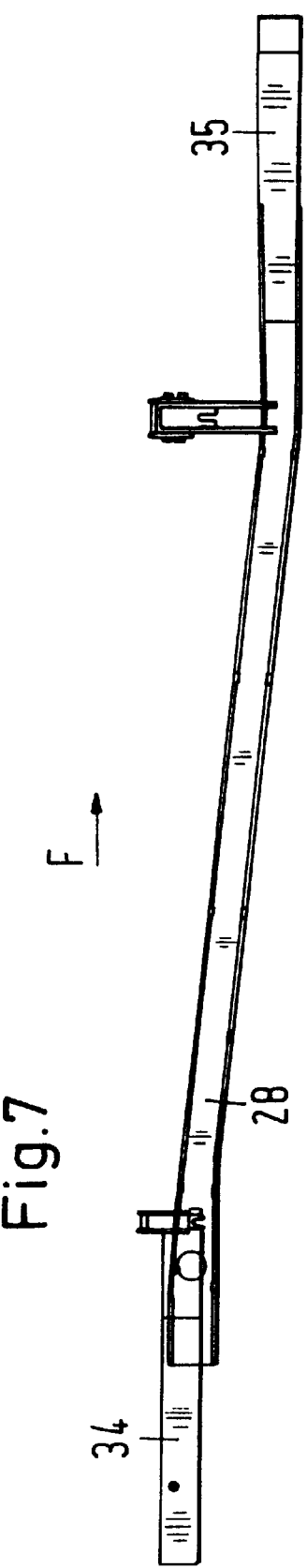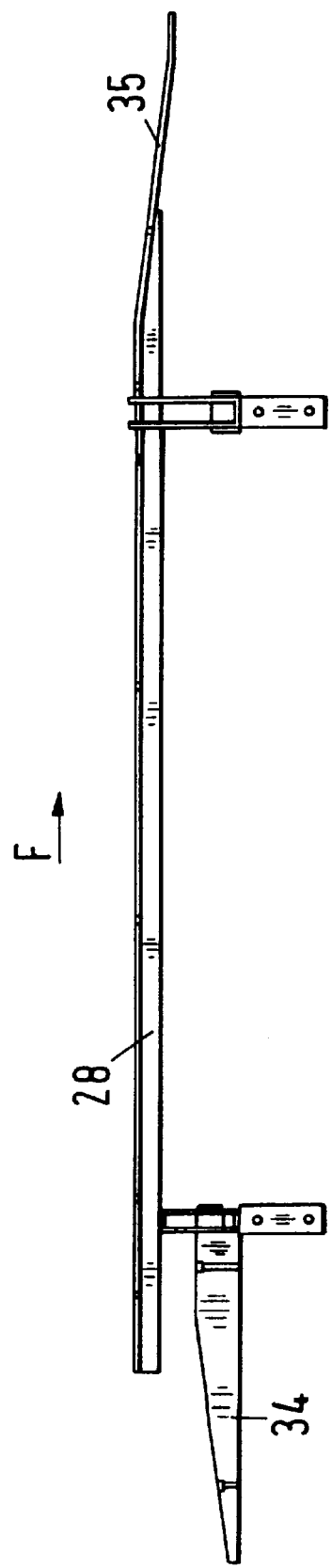

CONVEYOR FOR THE SORTING OF MIXED CARGO

BACKGROUND OF THE INVENTION

The invention relates to conveyors for the sorting of mixed cargo, especially of packages, small packets, containers and pieces of luggage, and more particularly to a conveyor having trays that tilt for the discharging of items off of the conveyor.

A prior tilting conveyor is disclosed in German Patent Specification DE 44 47 396 C1, which is incorporated herein by reference. This conveyor essentially consists of a multitude of carts, which are connected to each other and which can be moved on running rails, that form an endless transport track. The carts are chiefly constructed out of an undercarriage and a carrying tray mounted over this on support elements; the carrying tray can be swiveled from a horizontal transport position into a tilted position towards each of the two sides around a tilting axle, which runs in the direction of motion and essentially horizontally, for the delivery of the mixed cargo. Target stations, into which the mixed cargo is sorted on a preset basis through a tilting movement of the carrying tray after previously being supplied to the carrying trays through delivery stations, are arranged along the conveyor for the sorting of the mixed cargo. This sorting conveyor distinguishes itself by a simple and quickly-switching tilting device for the carrying tray.

This tilting device essentially consists of a sliding element that is guided at and between the support elements, crosswise to the direction of movement and capable mainly of movement horizontally. The sliding element moves either horizontally to the right or to the left to initiate the tilting of the carrying tray. The movement of the sliding element is initiated by rollers that are arranged on the lateral ends of the sliding element and that selectively engage curved rails positioned along the running rails. The movement of the sliding element is translated into a tilting movement of the carrying tray by a coupling lever connected on one side of the sliding element to a second lever attached to the tilting tray. This lever is connected at its center to the tilting axle running in the direction of motion, which is held at its ends by two support elements.

Two switching devices act on the sliding element at the end opposite to the lever; the switching devices are each mounted in the form of a lever around a switch shaft running horizontally and crosswise to the direction of motion. A carrier in the form of the roller that selectively engages the curved rail is mounted at the free end of the switch shaft. Each switching device can be swung around the switch shaft from a neutral position into an operating position. The switching device has a locking cam extending downwardly, viewed against the direction of motion, that latches the sliding element against the undercarriage in the neutral position, so that the carrying tray is held in the transport position.

The carrier or roller can be run into a curved rail that is C-shaped and open at the bottom to initiate and carry out the tilting movement of the carrying tray. The curved rail follows a course along the running rail in the area of the target stations. Because the curved rails each have a path that has a slight outward bend, the sliding element is pulled laterally outwards through the carrier that is guided in the curved rails. The lateral movement of the sliding element causes the coupling lever and the second lever to tilt the carrying tray to the side that lies opposite to the curved rail. Switchpoint elements designed as rollers, for example, that can be inserted from the side into the path of movement of the switching device are provided so that the switching device with its carrier can go into the curved rail starting in the area of the target station. The switching device is raised from its neutral position into an operating position that is essentially horizontal by the switchpoint elements when part of the mixed cargo is to be tipped over, so that the roller that is rotatable in this position around an axle that is essentially vertical can go into the C-shaped curved rail. The carrier is held in a vertical direction through the undercutting of the C-shaped curved rail. This conveyor for the sorting of mixed cargo has proven itself in actual use.

Another conveyor for the sorting of mixed cargo is described in the publication DE 40 90 308 T1 that likewise consists of a multitude of carts with undercarriages arranged one after the other. Each cart has a carrying tray which is arranged on top of the undercarriage and which can be laterally swiveled over a tilting axle running in the direction of motion. The driving of the carrying tray for the tilting movement, by moving carriers into curved rails following a course along the running rail, also takes place here. The conveyor distinguishes itself from the one previously described through the special design of the tilting mechanics, which essentially consist of two lateral levers coupled on the outside and beneath the carrying tray. The levers are each guided at half length through a pin in a linking guide, and the carrier for the interaction with the curved rail is mounted at the linking guide's free end. The carrier is designed as a roller that can be rotated around an axle running crosswise to the conveyor direction and essentially horizontally. It is possible to lock the carrying tray into the transport position and the tilted position with the help of the linking guide of the lever. To initiate the tilting movement, the lever has to therefore first be laterally swiveled towards the outside through the carrier, in order to unlatch the carrying tray. The roller is subsequently moved downwards by the curved rail; the carrying tray is tipped over because of this to the same side that the curved rail is placed. At the end of the tilting process, the lever is swiveled back again through the roller towards the inside, into a position that is as far vertical as possible, so that the carrying tray is locked into the tilted position.

These tilting mechanics of the conveyor for the sorting of mixed cargo have proven to be a disadvantage, because the lever has to be swiveled towards the outside and the inside for the latching and unlatching movement, and stress is consequently put on the rollers in the curved rails crosswise to their direction of motion. Wear and tear on them is consequently increased. In addition, the lever is located outside of its vertical position during the tilting movement of the carrying tray, so the axis of rotation of the roller runs at a slanted angle to its running surface. The roller only runs on one edge of its running surface during the tilting movement of the support roller because of this. Its wear and tear is also accelerated by this. Furthermore, the overall width of the individual carts is substantially increased because of the levers and the linking guides that are on the side and the outside. Additionally, the overall height of the conveyor is increased because of the arrangement of the curved rails beneath the cars, as well as their excursion to the top and bottom for carrying out the tilting movement. Further, assembly of the switchpoint elements and the curved rails that is very precise with regard to position is necessary, because positional imprecision of the switchpoint elements and of the curved rails is increased through the point of action of the levers on the carrying tray being far on the outside.

The desirability of a conveyor with a simple construction for the sorting of mixed cargo, especially of packages, small packets, containers and pieces of luggage with a compact size, which simultaneously has an optimized flow of power in the tilting mechanics can therefore be seen.

SUMMARY OF THE INVENTION

The present invention provides a conveyor for the sorting of mixed cargo, especially of packages, small packets, containers and pieces of luggage, that overcomes the above-identified difficulties, and is of simple construction and has an optimized flow of power in the tilting mechanics.

In accordance with one aspect of the present invention, an article sorting conveyor with carrying trays capable of being tilted laterally, is provided having tilting mechanics which are essentially specified by a sliding element movable crosswise to the conveyor direction through carriers that can be engaged in curved rails running parallel to the conveyor track in sections. A direct flow of power from the carriers guided in the curved rails, through the switch shaft, into the sliding element is achieved by the arrangement of the switch shafts of the switching devices acting on the sliding element in parallel to the tilting axle of the carrying tray Furthermore, a locking of the carrying tray in the transport position is able to be achieved because of the arrangement of a longitudinal slot arranged in one of the two support elements for mounting the tilting axle of the carrying tray. It is also possible through the design of the longitudinal slot, when expedient, that the carrier can be held at a stipulated height during the tilting movement of the carrying tray through the guide element that is directed in the longitudinal slot. The curved rail can thereby be designed as a U-shaped section open at the bottom when expedient.

The longitudinal slot for the guide element has an initial section, in which the guide element can assume two end positions, that runs diagonally to the direction of motion of the sliding element for the latching of the carrying tray in the transport position. In the first end position, designated as the operating position, the sliding element is essentially oriented horizontally and the carrier, which is designed as a roller when expedient, is mounted so as to be rotatable around an axle that is essentially vertical. The carrier can move into the curved rail in this operating position and is subsequently guided in the curved rails for the tilting movement. In the other end position, designated as the neutral position, the switching device is swiveled slightly downwards, so that the carrier can be moved past this above and below the curved rails.

A second section running parallel to the direction of motion of the sliding element for holding the carrier in the curved rail during the movement of the guide element in the operating position of the switching device between the transport position and the tilted position of the carrying tray opens onto this first section of the longitudinal slot.

There are plans in a further design of the invention to also lock the carrying tray in the tilted position. A third section likewise running diagonally to the direction of motion of the sliding element is connected for this onto the end of the second section that is turned away from the first section. The guide element can be swiveled out of its operating position into its neutral position within this section while the carrying tray is simultaneously in the tilted position. Because the third section and the first section each run diagonally to the direction of motion of the sliding element, a latching of the sliding element takes place in the case of a switching device in the neutral position through the guide elements supported in the longitudinal slot that are resting in the end positions of the sections.

In the development of the invention with carrying trays that each can be tilted to both sides of the direction of motion, two switching devices are provided for each sliding element; the switch shafts of the switching devices are each laterally offset to the tilting axle in the transport position of the carrying tray when viewed in the vertical direction and, with regard to the tilting axle, are arranged on opposites sides of it. Every cart consequently has two switching devices with carriers jutting outwards to the side. Because only the switching device arranged on the opposite side is required for the tilting movement of the carrying tray to the one side, an extension of the longitudinal slot by a fourth section is planned, in order to make a movement against its direction of action possible for the switching device that is not active. This fourth section is connected to the end of the first section that is turned away from the second section and runs parallel to the direction of motion of the sliding element. The switching device that is not active is thereby held in the neutral position, swiveled downwards, during the tilting of the carrying tray by the other switching device.

In a manner that is especially simple with regard to the design, the sliding element in the case of the conveyor at issue is formed from the two switch shafts of the switching devices, the ends of which are each connected to one another in a frame shape through a brace. The ends of the switch shafts are each guided in connection with this in a longitudinal slot running horizontally to the extent possible, each of which is arranged in the inner sides of the support elements. The braces are designed in the form of feather-key-shaped sliders in order to achieve an easy run of the sliding element in the longitudinal slots.

The switching devices, viewed in cross section and in the direction of motion, are preferably designed as articulated levers; the ends of the articulated levers projecting out on the side each support the carrier and the ends that project inwards each support the guide element. On the switching device, a carrier designed in the form of a roller is mounted on an axle that is oriented vertically in the case of the switching device in the operating position. Further, the switching devices have bevels on their underside and running in the direction of motion that interact with switchpoint elements arranged at the beginning of the curved rails for the movement of the switching device from the neutral position into the operating position. The switchpoint elements are designed in the form of a combination of rollers and sliders, movable for this purpose into the path of motion of the switching devices, over which the starting bevels of the switching devices run in the activated state, and the switching devices are consequently lifted. The curved rails are designed to be beveled at the bottom in order to sweep the switching devices out of their operating position and downward into their neutral position at the outlet of the curved rails.

To trigger the tilting movement of the carrying tray, the curved rails are likewise bent outwards, viewed in the direction of motion, to move the switching device outwards and run in the contrary direction to set the tray upright. The curved rails are also designed with an inverted U-shape, when viewed in cross-section, that is open at the bottom into which the carriers can be moved from the bottom. Because the carriers are held in their operating position through the guide elements in the longitudinal slots, a design of the curved rails in the form of a C-shape, when viewed in cross-section for the guidance of the carriers in the vertical direction is not necessary.

In addition, structural parts in the form of roller bearings and recesses on the support elements designed to form a complement to this are arranged on each switching device, in order to pass along the forces that are initiated by the carrying tray through the lever into the switching devices dependably into the support elements in the neutral position of the switching device with a carrying tray that is simultaneously in its transport position. Stress is taken off the guide elements in the longitudinal slots because of this.

The first and third sections of the longitudinal slot have a corresponding swivel radius of the guide element on the bent switching device path. A coupling lever that can swivel parallel to the tilting axle with its ends on the lever and the sliding element is mounted in order to transfer the forces between the lever that can swivel around the tilting axle and the sliding element that can be moved linearly, as well as crosswise to the direction of motion.

BRIEF DESCRIPTION OF THE DRAWINGS

FIG. 6 is a top view of a curved rail for a tilting movement;

FIG. 7 is a top view of a curved rail for a movement to set the carrying tray upright; and FIG. 8 is a side view of the curved rail of FIG. 7.

DETAILED DESCRIPTION OF THE PREFERRED EMBODIMENTS

Figure 1:
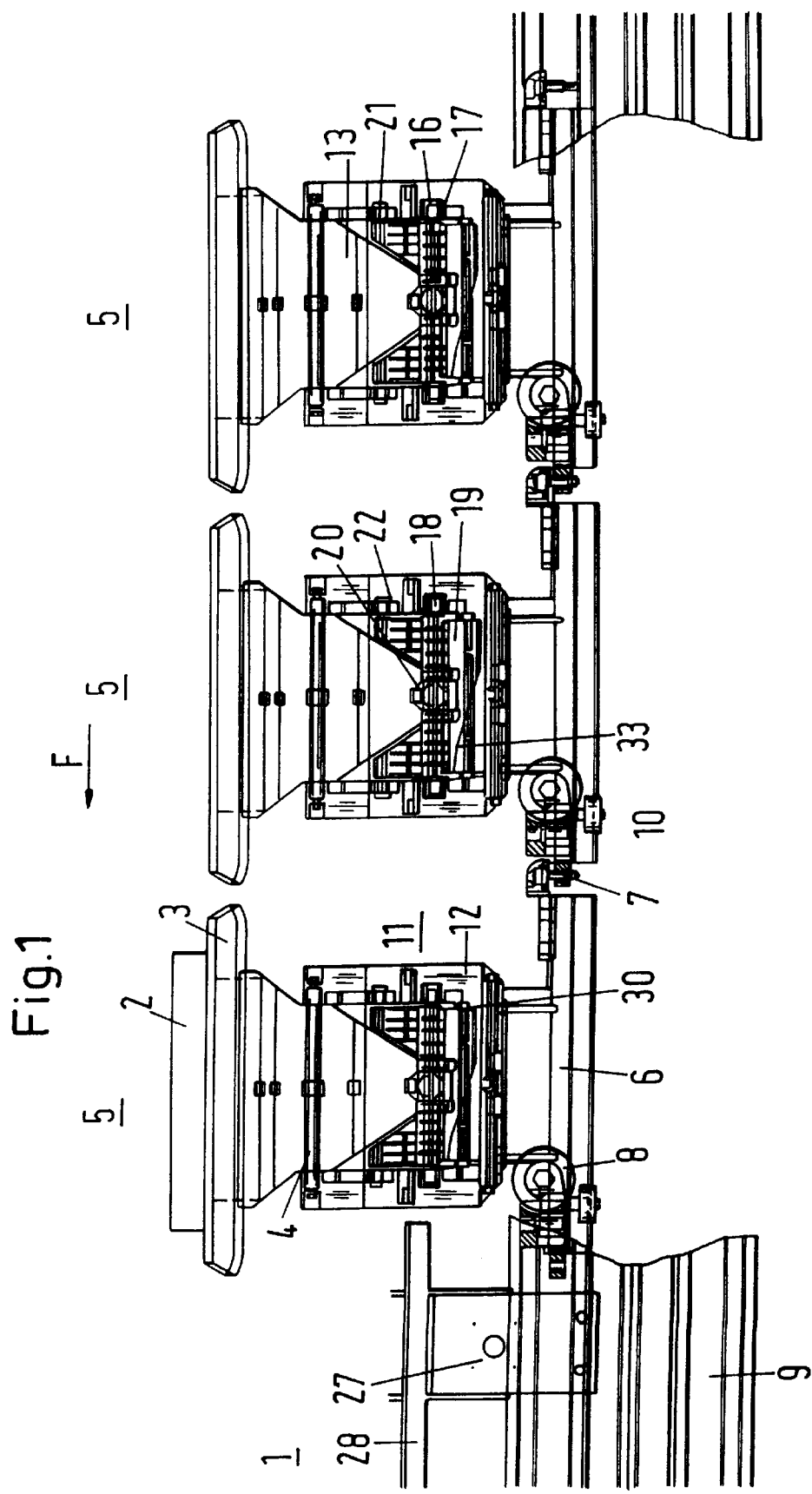
FIG. 1 is an elevational, fragmentary, sectional view of a conveyor according to one aspect of the present invention with carrying trays that can be tilted.

FIG. 1 shows a cutout section of a conveyor 1 for the sorting of mixed cargo pieces 2, especially of packages, small packets, containers or pieces of luggage, conveyor 1, not presented in its entirety, has a feed conveyor that can be designed, for example, as a roller conveyor or belt conveyor from which mixed cargo 2 is supplied to conveyor 1. Conveyor 1 is preferably designed as an endless conveyor track so that the mixed cargo 2 supplied by the feed conveyor is led past a multitude of target stations that can, for example, be designed as slides or likewise as a roller conveyor. In order to be able to deliver the mixed cargo pieces 2 from conveyor 1 to the target stations on a preselected basis, conveyor 1 has carrying trays 3 that are mounted so as to be able to swivel to both sides around a tilting axle 4 running in the direction of motion F for the transport of the mixed cargo pieces 2. The mixed cargo pieces 2 can consequently be transferred out to the target stations on a predetermined basis.

One can see in FIG. 1 that the carrying trays 3 belong to individual carts 5, which have an undercarriage 6 as a further essential component in addition to the carrying tray 3. The individual carts 5 are each connected into an endless chain with each other through a coupling 7. Provided on the undercarriage 6 are two running rollers 8 each, arranged next to each other when viewed in the direction of motion F, which support the undercarriage 6 on the front, when viewed in the direction of motion F, in the area of the coupling 7 on a conveyor track formed out of running rails 9. Further, guide rollers 10, which guide the undercarriage 6 laterally on the running rails 9 from the inside and which can be rotated around vertical axles, are on the undercarriage 6. The guide rollers 10 are mounted between the running rollers 8 and the coupling 7 for this purpose. The end of the undercarriage 6 turned away from the running rollers 8 is supported through the coupling 7 on the cart 5 following in the direction of motion F, viewed upstream, in order to be able to move cart 5 in a stable way on the running rails 9. Each undercarriage has to only have two running rollers 8, as well as two guide rollers 10, because of this arrangement.

Figure 2:
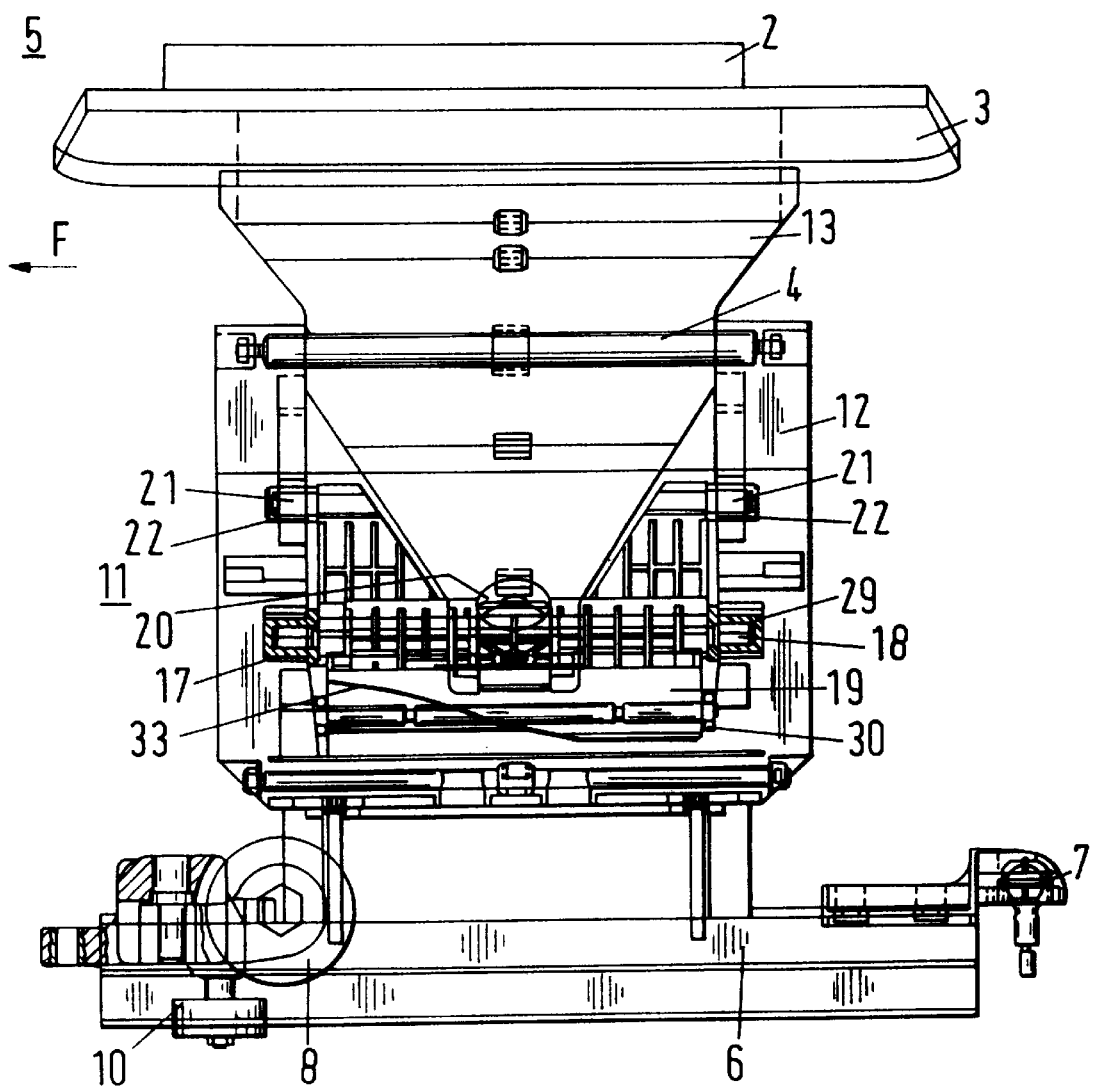
FIG. 2 is an enlarged, sectional view of a cart from FIG. 1.

The detailed construction of cart 5 can be found in FIG. 2, which shows a cutout section enlargement of a cart 5 from FIG. 1. It can be seen that the carrying tray 3 for the mixed cargo 2 is mounted on the undercarriage 6 through a tilting device 11. The tilting device 11 essentially consists of two L-shaped support elements 12 that form a U-shaped component, seen from the side view, with their legs turned towards each other and bordering on one another. The short legs of support elements 12 consequently form a pass-through base plate that is mounted on the undercarriage 6. One end of the tilting axle 4 running in the direction of motion F is mounted in each case on the end of the long legs of the support elements 12 turned away from the undercarriage 6. The carrying tray 3 is mounted through a lever 13 on the tilting axle 4. The lever 13 is designed as an articulated lever and developed so as to be roof-like with beveled gable walls in the side view in the area between the tilting axle 4 and the carrying tray 3, as well as developed so as to be triangular in the side view in the part connected to the tilting axle 4 at the bottom. The roof-like design of the lever 13 offers a large and therefore stable support surface for the carrying tray 3. The forces necessary for the tilting movement of the carrying tray 3 are initiated on an end of lever 13 opposite from carrying tray 3. The manner in which these tilting forces are initiated can be found in the following FIGS. 3 to 6, which show various views of an individual cart 5.

Figure 3:
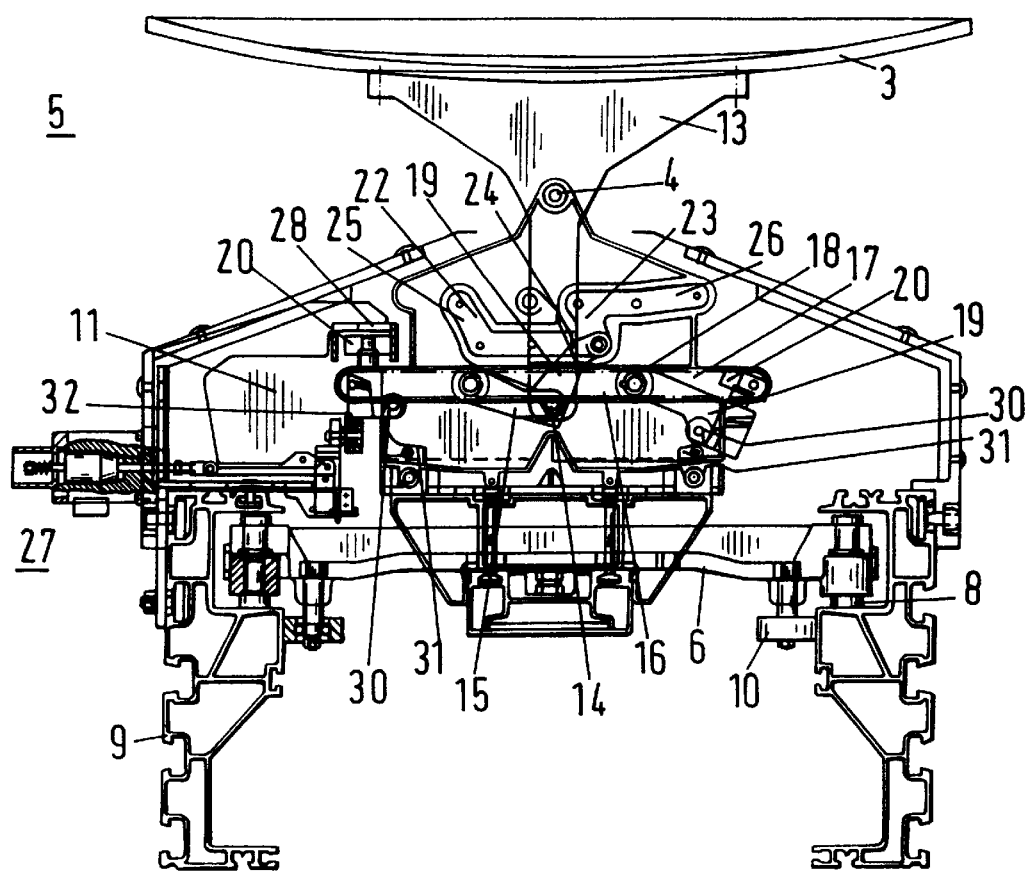
FIG. 3 is a front, sectional, elevational view of a cart of FIG. 1 shown with a running rail only partially presented.

It can be seen in FIG. 3, which shows a cross section through conveyor 1 and its cart 3, that the end of lever 13 opposite from carrying tray 3 is connected through a connecting axle 14 oriented in parallel to the tilting axle 4 with a coupling lever 15, which is connected in a movable way with a sliding element 16. The sliding element 16 is guided with its front and back ends, viewed in the direction of motion F, in each case in a longitudinal slot 17, which runs straight and horizontal crosswise to the direction of motion F, and is defined on the inside of the support element 12. In this longitudinal slot 17, the sliding element 16 can be moved from a center position, in which the carrying tray 3 is located in its horizontal transport position, to the right and the left into an end position in each case, in which the carrying tray 3 is located in its respective tilted position. The left end position of the sliding element 16 can be seen in FIG. 4, which shows a view in accordance with FIG. 3; the carrying tray 3 is, however, presented in a position that is tilted to the right-hand side. The coupling lever 15 has the task of transferring the forces between the sliding element 16, which can be moved horizontally, and the end of the lever 13, which moves in a circular arc. The support elements 12, the lever 13 and the sliding elements 16 are each designed as plastic injection-molded parts.

Figure 5:
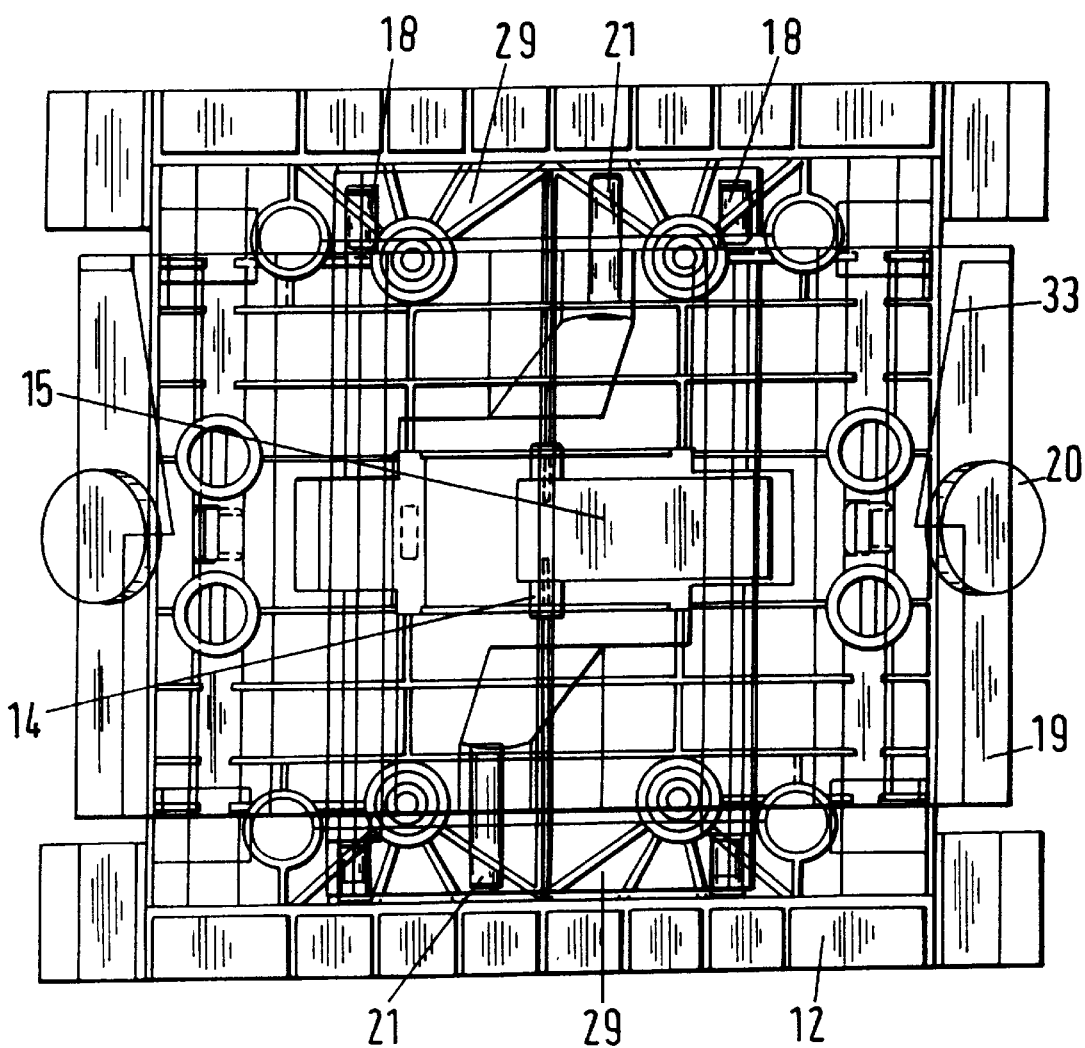
FIG. 5 is a horizontal, sectional view through an assembly of support elements of a cart in accordance with FIG. 2 at the height of the sliding element.

A horizontal section through a cart 5 at the height of the longitudinal slot 17 is presented in FIG. 5. It can be seen that the sliding element 16 is formed from two switch shafts 18, running in the direction of motion F and parallel to each other, the ends of which are each mounted in a common brace 29, so that the sliding element 16 is developed as a rectangular frame, seen from the top view. The braces 29 are arranged in a movable way in the form of thrust blocks here within the longitudinal slot 17 crosswise to the direction of motion F. Furthermore, at and laterally next to the switch shafts 18, there is a switching device 19 mounted in each case that supports carriers 20, which are preferably designed as rollers, at a height with the coupling lever 15, viewed in the direction of motion F. The switching devices 19 are designed as articulated levers; the lever end of the switching device 19 opposite to the carrier 20 and the switch shaft 18 is provided with a pin-shaped guide element 21, which engages in a guide slot 22. The switching devices 19 are designed in an asymmetrical fashion, seen from the top view, so that the right switching device, viewed in the direction of motion F, has a guide element 21 that engages in a guide slot 22, which is arranged on the inside of the support element 12 that is placed upstream, when viewed in the direction of motion F. The guide element 21 of the opposite switching device 19 is accordingly guided in a guide slot 22, which is arranged, when viewed in the direction of motion F, in the support element 12 placed upstream, viewed in the direction of motion F. Further, it can be seen in FIG. 5 that the switch shafts 18 are arranged in parallel to the direction of motion F and to the tilting axle 4, as well as laterally offset to the tilting axle 4, seen in a top view onto the cart 5.

FIG. 3 shows the carrying tray 3 in its transport position at the start of the initiation of a tilting process. The switching device 19 that is on the left, viewed in the direction of motion F, has already been swiveled for this purpose around the switch shaft 18 out of its neutral position, in which the guide element 21 is located in a lowered position, into the horizontal position. This swiveling process takes place through a switching roller 32 of a switchpoint element 27 engaging from the bottom on the switching device 19. The guide element 21 is located in this position of the carrying tray 3 in a first section 23 of the guide slot 22, which runs diagonally to the longitudinal slot 17, as well as having a curvature that corresponds to the swivel radius of the guide element 21 around the switch shaft 18. If the switching device is still in its neutral position, the guide element 21 in the first section 23 of the slot 22 is in its upper end position. A movement of the sliding element 16 in the longitudinal slot 17 to the left-hand side is prevented in this position because the guide element 21 is supported on the wall of the first section 23. Because the same arrangement is provided for the slot 22 with a first section 23, as well as for a switching device 19 with a guide element 21 on the opposite switching element 12 in a mirror-image form, a movement of the carrying tray 3 into the contrary direction is prevented if this other switching element 19 is also in its lowered neutral position. The carrying tray 3 can consequently be effectively latched in its transport position over the switching devices 19 with their guide elements 21.

The switchpoint elements 27 are provided in order to be able to release this latching for a tilting process of the carrying tray 3; the left or right switching device 19, depending on the desired tilting direction of the carrying tray 3, is raised out of its neutral position into an operating position that is horizontal to the extent possible by the switchpoint elements. Horizontal means here that the section of the switching device 19 between the switch shaft 18 and the carrier 20 is oriented horizontally. The axle for mounting the roller is essentially oriented in a vertical direction because of this in the case of a carrier 20 designed in the form of a roller. By swiveling the switching device 19 out of the neutral position into the operating position, the guide element 21 in the first section 23 of the slot 22 is simultaneously swiveled out of its upper end position into a lower end position. Because a second section 24, which runs parallel to the longitudinal slot 17, is connected to the first section 23 in the area of the lower end, the sliding element 16 can now be freely moved to the left within the longitudinal slot 17. The movement of the sliding element 16 within the longitudinal slot 17 takes place through the carrier 20 guided in a curved rail 28. The curved rail 28 is arranged so as to run horizontally, viewed in the direction of motion F, and bent outwards for this purpose (see FIG. 6 in particular).

Figure 4:
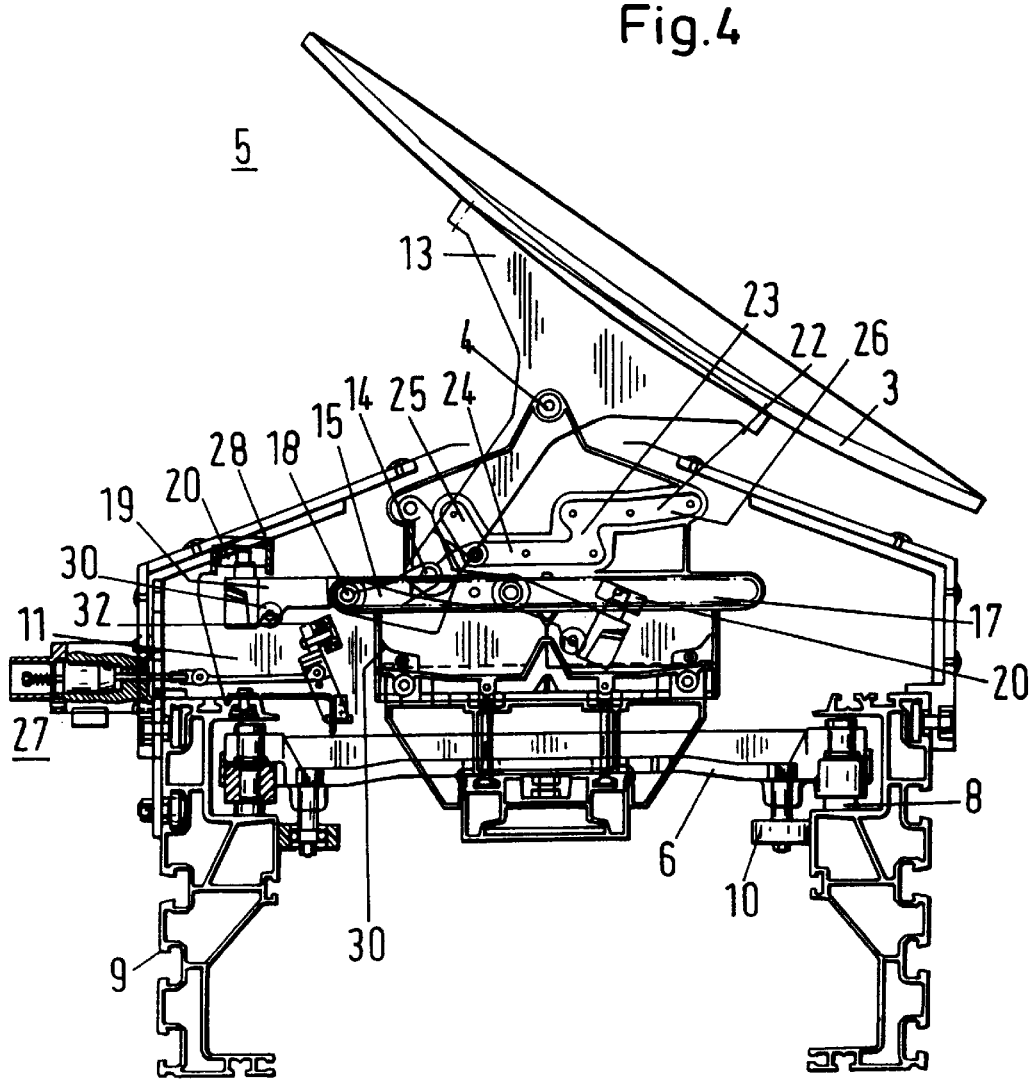
FIG. 4 is a front, sectional, elevational view of a cart of FIG. 1 shown with a carrying tray in a tilted position.

Furthermore, it can be seen in FIGS. 3 and 4 that, during the sliding movement of the sliding element 16 from its central position into its left end position, the switching device 19 is held in its operating position, because the guide element 21 in the second section 24 of the guide slot 22 cannot swivel away downwards. Whereas the active switching device 19 is pulled to the left by the carrier 20 and the curved rail 28 acting together here, the other switching device 19 remains in its neutral position. An extension of the guide slot 22 by a fourth section 26 is planned, in order to make a movement of the further switching device 19 possible contrary to its active direction of action. This fourth section 26 essentially runs in parallel to the longitudinal slot 17 and is, however, slightly bent away from the longitudinal slot 17 here, in order to hold the switching device 19 with its carrier 20 at an approximate height at which it will not collide during the swiveling process with other components of the tilting device 11. A third section 25 of the guide slot 22 is provided for latching the carrying tray 3 in its tilted position. The active switching device 19 can, corresponding to the first section 23, be swiveled out of its operating position around the switch shaft 18 into its neutral position within this third section 25. The course of the first section 23 is accordingly adapted to the swivel radius of the guide element 21 around the switch shaft 18. Because the guide element 21 cannot be moved parallel to the longitudinal slot 17 in the neutral position of the switching device 19, the carrying tray 3 is hereby locked in its tilted position. The guide element 21 of the other switching device 19 is in the tilted position of the carrying tray 3 in a fourth section 26 that is essentially parallel to the longitudinal slot 17. An outlet part 35 that has a downwards bend is provided at the outlet of the curved rail 28 for the movement of the switching device 19 after the tilting movement of the carrying tray 3 takes place from its operating position into the latched neutral position.

FIGS. 3 and 4 also show that the two switching devices 19 are in their neutral position, locking the carrying tray 13, in the case that the carrying tray 3 is in the transport position. In order to take the load off the guide elements 21 in the guide slots 22 with regard to the locking forces, there are additional plans for the switching devices 19 to have structural parts 30 in the form of rollers that can be rotated around the axles running in the direction of motion F, which are supported in recesses 31 in the support elements 12 designed to be complementary for this purpose. A movement of the switching devices 19 to the outside is additionally prevented in each case because of this, and the carrying tray 3 is consequently latched in its transport position.

In addition, the design of the switchpoint elements 27 can be seen in FIGS. 3 and 4. The switchpoint elements 27 essentially consist of a switching roller 32, to which the sliders 36 are connected when viewed in the conveyor direction F. The switchpoint elements can be moved through a swivel movement around an axle running in the direction of motion F and beneath the curved rail 28 laterally into the path of motion of the switching devices 19 in the neutral position. In this switching position, the switching devices 19 with their starting bevels 33 (see FIG. 2) drive against the switching rollers 32 and the sliders 36 and are consequently continuously raised from their neutral position into the operating position. At the same time, the carrier 20 arranged on the opposite side of the switching device 19 is raised into the curved rail 28. Because the curved rail 28 has an outward bend, viewed in the direction of motion F, the guide element 21 in the guide slot 22 is pulled into the second section 24, and the carrier 20 is consequently held in the curved rail 28, which is preferably designed as a U-shaped section open at the bottom. At the beginning of the curved rail 28, the carrier 20 is held in the raised position first through the switching rollers 32 and then through the sliders 36, as well as subsequently through the second section 24. It can be easily seen in FIG. 6, which shows a top view of a running rail 9 and a curved rail 28 arranged on this, that the beginning and the end of the curved rail 28 is designed in a slight funnel shape, viewed in the direction of motion F, in order to make the movement in and out of the carrier 20 easier. Because of the bowed course of the curved rail 28, it is possible to move the sliding element 16 for the tilting movement of the carrying tray 3 in the longitudinal slot 17.

Further, a top view and a side view of a curved rail 28, which is for setting the carrying trays 3 upright from their tilted position into their transport position and which is arranged above a running rail 9, are shown in FIGS. 7 and 8. A ramp 34 that is fixed in place is provided at the beginning of the curved rail 28 for this purpose; the switching device 19 is raised from its neutral position into the operating position by means of the ramp. After this, the curved rail 28 runs contrary to the course shown in FIG. 6, so that the switching device 19, and consequently the sliding element 16, is pushed from its end position into its central position again. Located at the end of the curved rail 28 is an outlet part 35, oriented downwards, with which the switching device 19 is pushed out of its operating position into its neutral position at the end of the movement to set the carrying tray 3 upright, with the objective of locking the carrying tray 9.

The embodiments of the present invention in which an exclusive property or privilege is claimed are defined as follows:

1. An article conveyor comprising:
   running rails;
   at least one cart movable along said running rails and having an undercarriage;
   a plurality of support elements arranged on the undercarriage and spaced apart from each other in the direction of motion of the conveyor;
   a tilting axle mounted on the support elements and running in the direction of motion which supports through a lever a carrying tray that can be swiveled out of a generally horizontal transport position into a tilted position for the lateral delivery of mixed cargo into a predetermined target station;
   a sliding element, connected in a movable fashion with an end of the lever opposite the carrying tray, said sliding element guided between and at the support elements crosswise to the direction of motion for carrying out the tilting movement;
   at least one switching device pivotally mounted on the sliding element so as to be able to swivel on a switch shaft between neutral and operating positions, said switching device adapted to lock the carrying tray at least in the horizontal transport position, said switch shaft of the switching device being oriented parallel to the tilting axle of the carrying tray;
   a carrier mounted on the at least one switching device;
   a switchpoint element in the area of the target station;
   a curved rail running along the running rails in sections in the area of the target station, said switchpoint element adapted to be moved during the motion of the cart to cause said carrier to move from a neutral position locking the carrying tray into an operating position wherein said carrier is guided in the curved rail, said curved rail controlling the movement of said sliding element and consequently the tilting movement of the carrying tray;
   a guide element being arranged on the switching device, which is guided by a guide slot defined in at least one of said plurality of support elements in such a way that the sliding element is locked in the transport position of the carrying tray when said at least one switching device is simultaneously in the neutral position;
   whereby the carrier of the switching device is held in the curved rail during the tilting movement of the carrying tray.

2. A conveyor according to claim 1 wherein said conveyor sorts articles according to a physical characteristic of the article.

3. A conveyor according to claim 1 wherein the sliding element is connected through a coupling lever in a movable way with the end of the lever opposite the carrying tray.

4. A conveyor according to claim 1 further including structural parts arranged on the first and second switching device and complementary recesses arranged on the support elements through which the tilting action of the carrying tray can be initiated into the support elements in the neutral position of the first and second switching device.

5. A conveyor according to claim 1 wherein the sliding element is guided via its front and back ends, viewed in the direction of motion, which are each positioned in a longitudinal slot that runs horizontally and that is arranged in the support elements.

6. A conveyor according to claim 1 wherein the support elements, viewed in the direction of motion of the conveyor, have a triangular cross section, and are arranged so that a leg stands upright on the undercarriage, and the tilting axle being mounted on the end that is turned away from the undercarriage.

7. A conveyor according to claim 1 wherein the at least one switching device has a starting bevel running on its underside in the direction of motion of the carts; the switchpoint element at the start of the curved rail being designed in the form of a combination of switching rollers and sliders for the tilting movement of the carrying tray, movable into the path of motion of the at least one switching device, through which the at least one switching device with its stating bevel running over the switching rollers and sliders can be swiveled out of the neutral position into the operating position.

8. A conveyor according to claim 1 wherein the curved rail has an outlet part that is moved downwards in such a way that the at least one switching device can be swiveled out of the operating position downwards into the fneutral position.

9. A conveyor according to claim 1 wherein the curved rail, viewed in the direction of motion of the carts is bent outwards on a side of the conveyor for tilting the carrying tray toward an opposite side, said curved rail being bent inward for returning the carrying tray to the upright position, and said curved rail having a U-shaped section that is open at the bottom into which the carrier can be moved from the bottom.

10. A conveyor according to claim 1, wherein the at least one switching device is an articulated lever, viewed in cross section and in the direction of motion of the conveyor, having an outward-projecting end at which the carrier is attached and an inward-projecting end at which the guide element is attached.

11. A conveyor according to claim 1 wherein the guide element is guided in the guide slot, in such a manner that the sliding element is locked in the tilted position of the carrying tray when said at least one switching device is simultaneously in the neutral position.

12. A conveyor according to claim 11 wherein the curved rail, viewed in the direction of motion of the cart is bent outwards on a side of the conveyor for tilting the carrying tray toward an opposite side, said curved rail being bent inward for returning the carrying tray to the upright position, and said curved rail having a U-shaped section that is open at the bottom into which the carrier can be moved from the bottom.

13. A conveyor according to claim 11, wherein the at least one switching device is an articulated lever, viewed in cross section and in the direction of motion of the conveyor, having an outward-projecting end at which the carrier is attached and an inward-projecting end at which the guide element is attached.

14. A conveyor according to claim 1 wherein said at least one switching device comprises a first and a second switching device, each of said first and second switching devices being mounted on a single switch shaft for one of the tilting movements of the carrying tray from the transport position to a tilted position of either one or both sides, and the switch shafts each being laterally offset to the tilting axle in the transport position of the carrying tray, viewed in the vertical direction, and being arranged on opposite sides with respect to the tilting axle.

15. A conveyor according to claim 14 wherein the first and third sections of the guide slot have a course that is curved in accordance with the swivel radius of the guide element.

16. A conveyor according to claim 14 wherein the ends of the switch shafts are each connected with each other in a frame shape through a brace and form the sliding element.

17. A conveyor according to claim 16 wherein the ends of the switch shafts project out over the braces, said braces being designed as thrust blocks and being guided in a longitudinal slot.

18. A conveyor according to claim 1, wherein the guide slot for the guide element further comprises:
 a first section running diagonally to the direction of motion of the sliding element for the latching of the carrying tray in the transport position by a swiveling movement of the switching device around the switch shaft out of the operating position into the neutral position; and
 a second section connected to the first section and running parallel to the direction of motion of the sliding element for guiding the carrier in the curved rail during the movement of the guide element in the operating position of the switching device between the transport position and the tilted position of the carrying tray.

19. A conveyor according to claim 18 wherein the curved rail, viewed in the direction of motion of the carts is bent outwards on a side of the conveyor for tilting the carrying tray toward an opposite side, said curved rail being bent inward for returning the carrying tray to the upright position, and said curved rail having a U-shaped section that is open at the bottom into which the carrier can be moved from the bottom.

20. A conveyor according to claim 18 wherein the guide element is guided in the guide slot, in such a manner that the sliding element is locked in the tilted position of the carrying tray when said at least one switching device is simultaneously in the neutral position.

21. A conveyor according to claim 20 wherein the guide slot for the guide element further comprises a third section connected to the second section of the guide slot and running diagonally to the direction of motion of the sliding element for latching the carrying tray in the tilted position by a swiveling movement of the switching device around the switch shaft out of the operating position into the neutral position.

22. A conveyor according to claim 21 wherein the first and third sections of the guide slot have a course that is curved in accordance with the swivel radius of the guide element.

23. A conveyor according to claim 21 wherein the guide slot for the guide element has a fourth section bordering on the end of the first section that is turned away from the second section and that runs parallel to the direction of motion of the sliding element for guiding a second carrier, on said second switching device when said second switching device is in said operating position.

24. A conveyor according to claim 23, wherein the first and second switching devices are articulated levers, viewed in cross section and in the direction of motion of the conveyor, having an outward-projecting end at which the carrier is attached and an inward-projecting end at which the guide element is attached.

25. A conveyor according to claim 23 further including structural parts arranged on the first switching device and complementary recesses arranged on the support elements through which the tilting action of the carrying tray can be initiated into the support elements in the neutral position of the first switching device.

26. A conveyor according to claim 21 wherein said at least one switching device comprises a first and a second switching device, each of said first and second switching devices being mounted on a single switch shaft for one of the tilting movements of the carrying tray from the transport position to a tilted position of either one of both sides, and the switch shafts each being laterally offset to the tilting axle in the transport position of the carrying tray, viewed in the vertical direction, and being arranged on opposite sides with respect to the tilting axle.

27. A conveyor according to claim 26 wherein the guide slot for the guide element has a fourth section bordering on the end of the first section that is turned away from the second section and that runs parallel to the direction of motion of the sliding element for guiding a second carrier, on said second switching device when said second switching device is in said operating position.

28. A conveyor according to claim 26 wherein the ends of the switch shafts are each connected with each other in a frame shape through a brace and form the sliding element.

29. A conveyor according to claim 28 wherein the guide slot for the guide element has a fourth section bordering on the end of the first section that is turned away from the second section and that runs parallel to the direction of motion of the sliding element for guiding a second carrier, on said second switching device when said second switching device is in said operating position.

30. A conveyor according to claim 29, wherein the first and second switching devices are articulated levers, viewed in cross section and in the direction of motion of the conveyor, having an outward-projecting end at which the carrier is attached and an inward-projecting end at which the guide element is attached.

31. A conveyor according to claim 29 further including structural parts arranged on the at least one switching device and complementary recesses arranged on the support elements through which the tilting action of the carrying tray can be initiated into the support elements in the neutral position of the at least one switching device.

32. A conveyor according to claim 29 wherein the sliding element is guided via its front and back ends, viewed in the direction of motion, which are each positioned in a longitudinal slot that runs horizontally and that is arranged in the support elements.

33. A conveyor according to claim 32 wherein the ends of the switch shafts project out over the braces, said braces being designed as thrust blocks and being guided in a longitudinal slot.

34. A conveyor according to claim 33 wherein the first and second switching devices are articulated levers, viewed in cross section and in the direction of motion of the conveyor, having an outward-projecting end at which the carrier is attached and an inward-projecting end at which the guide element is attached.

35. A conveyor according to claim 34 wherein the first and third sections of the guide slot have a course that is curved in accordance with the swivel radius of the guide element.

* * * * *

UNITED STATES PATENT AND TRADEMARK OFFICE
CERTIFICATE OF CORRECTION

PATENT NO. : 6,193,074 B1 Page 1 of 1
DATED : February 27, 2001
INVENTOR(S) : Ingolf Baum, Heinrich Droste and Holger Humburg It is certified that error appears in the above-identified patent and that said Letters Patent is hereby corrected as shown below:

Column 5,
Line 44, insert -- . -- after "luggage"

Column 10,
Lines 32 and 36, "first and second" should be -- at least one --
Line 56, "stating" should be -- starting --
Line 62, "fneutral" should be -- neutral --

Column 11,
Line 11, delete "," after "slot"
Line 64, insert -- , -- after "cart"

Column 12,
Line 2, delete "," after "slot"
Line 24, delete "," after "23"
Line 41, delete "of" (in the second instance, before "both") and insert -- or --

Signed and Sealed this

Third Day of December, 2002

JAMES E. ROGAN
*Director of the United States Patent and Trademark Office*